United States Patent
Rijsman

(10) Patent No.: US 9,178,780 B2
(45) Date of Patent: *Nov. 3, 2015

(54) DYNAMIC REMOTE PACKET CAPTURE

(71) Applicant: Juniper Networks, Inc., Sunnyvale, CA (US)

(72) Inventor: Bruno Rijsman, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/529,418

(22) Filed: Oct. 31, 2014

(65) Prior Publication Data

US 2015/0043376 A1 Feb. 12, 2015

Related U.S. Application Data

(63) Continuation of application No. 13/535,038, filed on Jun. 27, 2012, now Pat. No. 8,879,558.

(51) Int. Cl.
*H04L 12/26* (2006.01)
*H04L 12/24* (2006.01)

(52) U.S. Cl.
CPC .............. *H04L 43/04* (2013.01); *H04L 41/142* (2013.01); *H04L 43/065* (2013.01)

(58) Field of Classification Search
CPC ....... H04L 43/04; H04L 12/54; H04L 43/065; H04L 41/142
See application file for complete search history.

(56) References Cited

U.S. PATENT DOCUMENTS

| | | | | |
|---|---|---|---|---|
| 5,790,554 | A * | 8/1998 | Pitcher et al. | 370/471 |
| 5,982,753 | A | 11/1999 | Pendleton et al. | |
| 7,215,639 | B2 * | 5/2007 | De Maria et al. | 370/235 |
| 7,877,508 | B1 * | 1/2011 | Jain et al. | 709/238 |
| 8,879,558 | B1 | 11/2014 | Rijsman | |
| 2004/0013086 | A1 * | 1/2004 | Simon et al. | 370/230 |
| 2004/0049276 | A1 * | 3/2004 | Reiley | 623/17.11 |
| 2004/0250158 | A1 * | 12/2004 | Le Pennec et al. | 714/4 |
| 2005/0129019 | A1 | 6/2005 | Cheriton | |
| 2006/0031472 | A1 * | 2/2006 | Rajavelu et al. | 709/224 |
| 2009/0190593 | A1 | 7/2009 | Nomura et al. | |
| 2009/0313386 | A1 * | 12/2009 | Hamamoto et al. | 709/245 |
| 2010/0146113 | A1 | 6/2010 | Matityahu et al. | |
| 2010/0230210 | A1 | 9/2010 | Hanks et al. | |

(Continued)

OTHER PUBLICATIONS

Van Jacobson et al., "pcap(3)—Linux man page", Lawrence Berkeley National Laboratory, http://linux.die.net/man/3/pcap, Jul. 11, 2007, 15 pages.

(Continued)

*Primary Examiner* — Brian D Nguyen
(74) *Attorney, Agent, or Firm* — Harrity & Harrity, LLP

(57) ABSTRACT

A device may be configured to receive information regarding one or more ports associated with a routing device; output, to the routing device, filter information associated with at least a particular port, of the one or more ports associated with the routing device, the filter information specifying one or more conditions associated with traffic of interest; receive, from the routing device, and based on the outputted filter information, information regarding traffic of interest received or sent by the routing device via the particular port, the traffic of interest being less than or equal to all traffic received or sent by the routing device via the particular port; and store or output a representation of at least a portion of the received information regarding the traffic of interest.

20 Claims, 8 Drawing Sheets

(56) References Cited

U.S. PATENT DOCUMENTS

| | | |
|---|---|---|
| 2011/0087979 A1 | 4/2011 | Breslin et al. |
| 2011/0141937 A1 | 6/2011 | Breslin et al. |
| 2011/0261710 A1 | 10/2011 | Chen et al. |
| 2013/0080774 A1 | 3/2013 | Combet et al. |
| 2013/0094376 A1 | 4/2013 | Reeves |
| 2013/0276054 A1 | 10/2013 | Martini |

OTHER PUBLICATIONS

Tim Carstens, "Programming with pcap", http://www.tcpdump.org/pcap.html, 2002, 8 pages.

Wikipedia, "Snort", http://web.archive.org/web/20100817215753/http://en.wikipedia.org/wiki/snort, Jan. 1, 2010, 2 pages.

Wikipedia, "tcpdump", http://web.archive.org/web/20110309054425/ http://en.wikipedia.org/wiki/tcpdump, Jan. 29, 2011, 4 pages.

Wikipedia, "Wireshark", http://web.archive.org/web/20081224000547/http://en.wikipedia.org/wiki/wireshark, Dec. 10, 2008, 4 pages.

"Configuring SPAN and RSPAN," Chapter 28, Catalyst 3560 Switch Software Configuration Guide, Cisco IOS Release 12.2(44)SE, Jan. 2008, pp. 28-1 to 28-24.

"Understanding Port Mirroring," LockerGnome, Diana Huggins, Mar. 19, 2007, http://www.lockergnome.com/it/2007/03/19/understanding-port-mirroring/, 2 total pages.

"SPAN RSPAN and ERSPAN," Suman's Networking—CISCO, May 18, 2011, Sumankedala, http://sumankedala.blogspot.com/2011/05/span-rspan-and-erspan.html, 3 total pages.

* cited by examiner

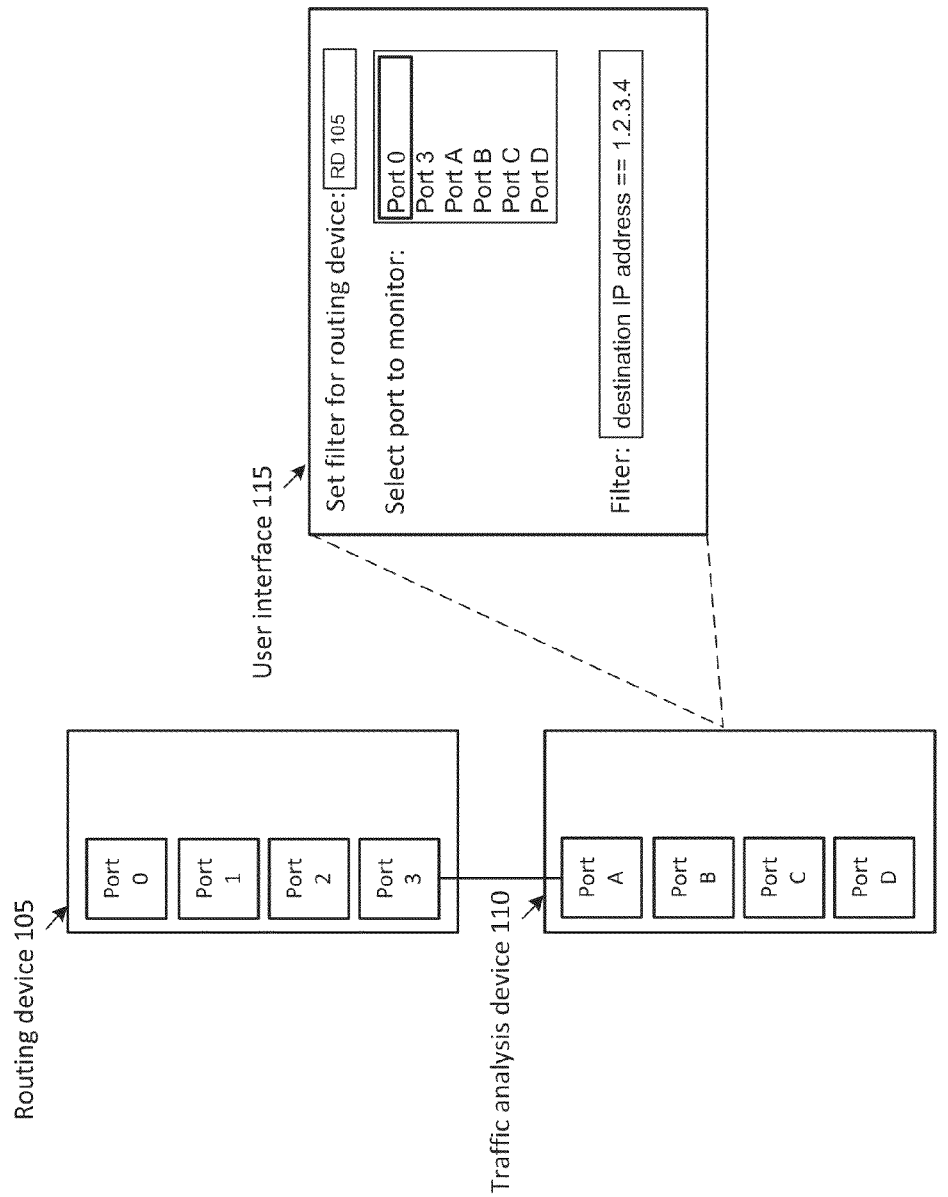

DYNAMIC REMOTE PACKET CAPTURE

RELATED APPLICATION

This application is a continuation of U.S. patent application Ser. No. 13/535,038, filed Jun. 27, 2012 (now U.S. Pat. No. 8,879,558), which is incorporated herein by reference.

BACKGROUND

Networks often include routing devices, such as routers and/or switches, that aid in directing vast amounts of traffic from multiple sources to multiple destinations. Traffic analysis devices may be used to analyze traffic that is handled by routers and/or switches. Some or all of the analyzed traffic may be of interest, such as traffic that is directed to a particular destination, traffic that arrived from a particular source, etc. A traffic analysis device may receive a copy of traffic handled by a particular routing device (e.g., all traffic handled by the routing device, all traffic associated with a particular interface of the routing device, etc.), and may identify traffic of interest out of the received copy of traffic.

SUMMARY

According to some implementations, a device may be configured to receive information regarding one or more ports associated with a routing device; output, to the routing device, filter information associated with at least a particular port, of the one or more ports associated with the routing device, the filter information specifying one or more conditions associated with traffic of interest; receive, from the routing device, and based on the outputted filter information, information regarding traffic of interest received or sent by the routing device via the particular port, the traffic of interest being less than or equal to all traffic received or sent by the routing device via the particular port; and store or output a representation of at least a portion of the received information regarding the traffic of interest.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 1A and 1B illustrate an overview of example implementations described herein;

DETAILED DESCRIPTION

The following detailed description refers to the accompanying drawings. The same reference numbers in different drawings may identify the same or similar elements.

A system and/or method, according to one or more implementations described herein, may allow a traffic analysis device to analyze portions of traffic (e.g., traffic of interest) handled by a routing device on a network. According to some implementations herein, the traffic analysis device may analyze portions of the traffic handled by the routing device without necessitating the routing device to send additional traffic to the traffic analysis device (e.g., traffic handled by the routing device that is not traffic of interest). That is, instead of providing a copy of extraneous traffic that is not traffic of interest (e.g., all traffic handled by the routing device, all traffic received/and or transmitted at a particular interface of the routing device, etc.), the routing device may provide a copy of only the traffic of interest to the traffic analysis device.

Furthermore, a system and/or method, according to one or more implementations described herein, may allow a traffic analysis device to perform one or more of the above-described techniques using a network analysis software tool that has the capability to analyze traffic at local ports (e.g., only ports that are physically present on a device that is running the network analysis software tool, but not ports of other devices). Such network analysis software tools may include currently-available network software tools, such as, for example, Wireshark, Tcpdump, Snort, and/or any other network analysis software tool. As described in further detail below, a traffic analysis device, according to one or more implementations, may implement an application programming interface ("API") in a manner that allows commands, that are issued by local network analysis software tools and relate to local traffic analysis, to cause an external routing device to forward traffic to the traffic analysis device.

Figure 1B:
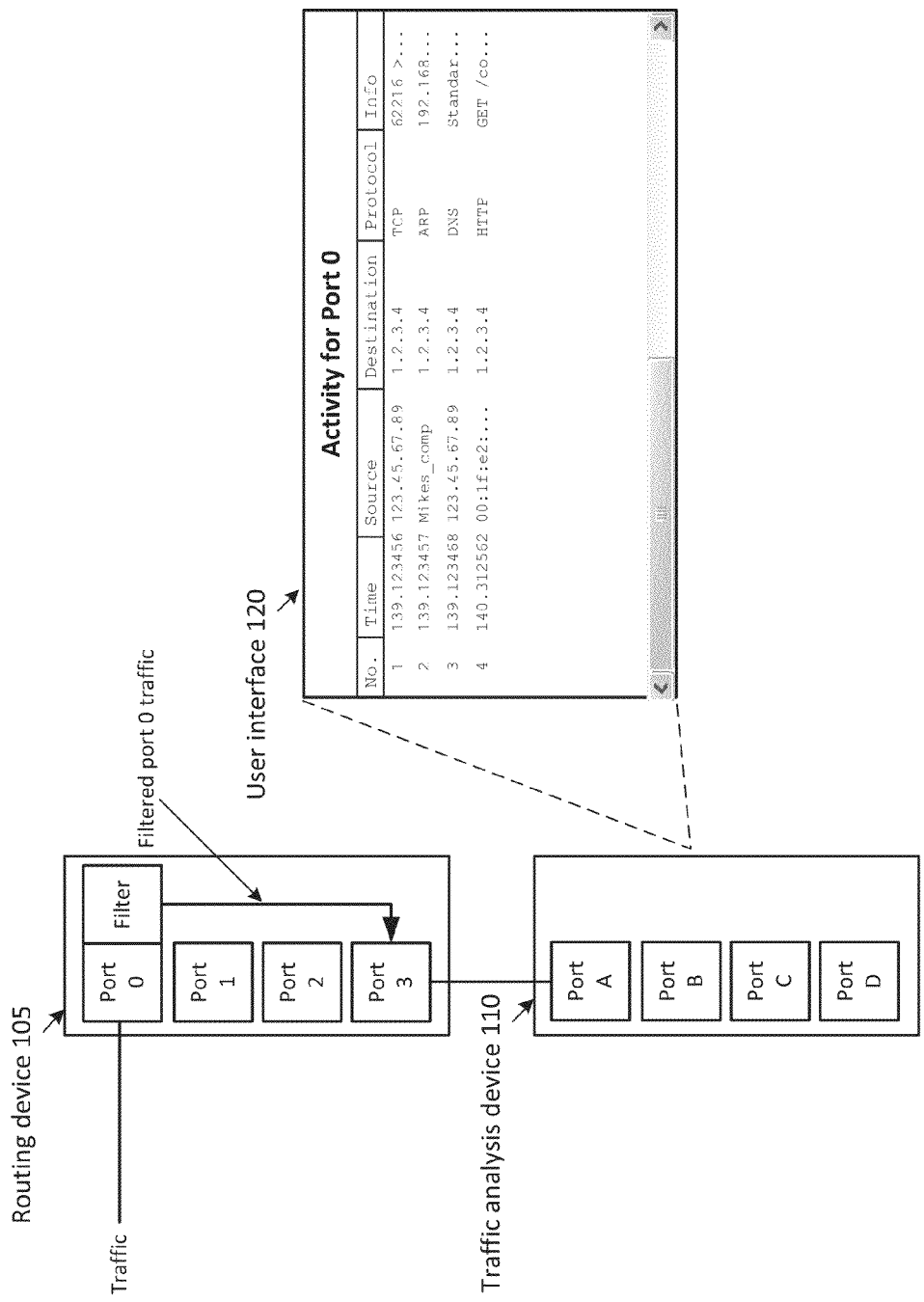

FIGS. 1A and 1B illustrate an overview of example implementations described herein. FIG. 1A, for example, illustrates an overview of selecting traffic of interest (also referred to as configuring a filter). FIG. 1A shows routing device 105, which may include several interfaces through which routing device 105 may send and/or receive traffic, such as ports 0-3. FIG. 1A also shows traffic analysis device 110, which may also include several interfaces, such as ports A-D. As shown in FIG. 1A, routing device 105 may be connected to traffic analysis device 110—e.g., port 3 of routing device 105 may be connected to port A of traffic analysis device 110 (e.g., directly, such as via a physical wired connection or indirectly, such as via one or more networks, via a tunnel, etc.).

Traffic analysis device 110 may present (e.g., via one or more display devices associated with traffic analysis device 110) user interface 115. In some implementations, user interface 115 may be associated with a currently available network analysis software tool, such as Wireshark, Tcpdump, Snort, and/or any other network analysis software tool. User interface 115 may allow for specification of traffic of interest. For example, user interface 115 may allow for the creation and/or configuration of one or more filters. These filters may specify, for example, ports to monitor (e.g., one or more ports associated with routing device 105 and/or traffic analysis device 110) and/or attributes associated with the traffic of interest (e.g., source address, destination address, protocol type, and/or any other attribute). In some implementations, the ports shown in user interface 115 may be presented as local ports (e.g., ports that are local to traffic analysis device 110, without indicating that some ports may be associated with other devices, such as routing device 105). As shown in FIG. 1A, traffic, that is handled by port 0 and has a destination IP address of 1.2.3.4, may be identified as traffic of interest.

Traffic analysis device 110 may indicate to routing device 105 that traffic, that is handled by port 0 and has a destination IP address of 1.2.3.4, is traffic of interest. For example, the network analysis software tool, which is running on traffic analysis device 110, may issue a command to create a filter based on traffic, that is handled by port 0 and has a destination IP address of 1.2.3.4. In some implementations, this command may be a command associated with generating a filter at a local port (e.g., a port that is physically present at a device on which the network analysis software tool is running).

In some implementations, traffic analysis device 110 may be associated with a currently available API, such as Berkeley Software Distribution Packet Filters ("BPF"), Packet Capture Library ("libpcap"), and/or any other API, which may include an instruction for creating a filter at a particular port. Traffic analysis device 110 may be associated with an implementation of this instruction, for creating a filter at a particular port, which may cause traffic analysis device 110 to issue a command and/or a request to routing device 105 to create a filter at the particular port when the network analysis software tool issues a command to create a filter. The instruction, according to an implementation of the API, may include a translation of the command issued by the network analysis software tool to a command associated with routing device 105. For instance, traffic analysis device 110 may store and/or access one or more software libraries (e.g., one or more dynamic libraries) that include information regarding commands associated with routing device 105, in order to translate command issued by the network analysis software tool. By utilizing such a library (e.g., a dynamic library), traffic analysis device 110 may be capable of translating commands, issued by network analysis software tools, to a variety of different types of routing devices without recompiling the implementation of the API.

The instruction for creating a filter at the particular port, according to the implementation of the API may be an instruction that includes any protocol that may be used for discovering ports and/or installing filters, such as OpenFlow, one or more proprietary protocols, and/or any other such protocol. In this sense, some implementations may allow currently existing network analysis software tools and/or APIs to be used in conjunction with the techniques described herein.

As shown in FIG. 1B, routing device 105 may forward a copy of filtered traffic, that is handled by port 0 and has a destination IP address of 1.2.3.4, associated with port 0, to traffic analysis device 110. That is, while port 0 may handle traffic with several different destination addresses, routing device 105 may forward a copy of only some of the traffic handled by port 0 (i.e., only the traffic that has a destination IP address of 1.2.3.4). Thus, in some implementations, routing device 105 may forgo forwarding a copy of traffic, that is not associated with the filter (e.g., traffic that is associated with ports 1-3, traffic associated with port 0 that does not have a destination IP address of 1.2.3.4, etc.), to traffic analysis device 110.

Traffic analysis device 110 may present, via a display device associated with traffic analysis device 110, user interface 120. User interface 120 may output information regarding the filtered traffic received from routing device 105 (e.g., traffic associated with port 0 of routing device 105, which has a destination IP address of 1.2.3.4). The displayed information may be any information about the traffic, such as a time associated with the traffic, information identifying a source of the traffic, information identifying a destination of the traffic (i.e., an IP address of 1.2.3.4, in this example), a protocol associated with the traffic, content of a payload associated with the traffic (e.g., the type of traffic, such as video traffic, voice traffic, text traffic, etc.), header information associated with the traffic, and/or any other information regarding the traffic.

By forgoing forwarding traffic, in addition to the traffic of interest, to a network analysis device, some implementations may eliminate the need for high-bandwidth connections between a routing device and a network analysis device. Such high-bandwidth connections may be costly, as high-speed interfaces and/or cables may be scarce and/or expensive. Furthermore, a system according to some implementations may consume less network bandwidth than implementations that forward traffic in addition to traffic of interest. Additionally, a network analysis device, according to some implementations described herein, may expend less processing resources than a network analysis device that receives additional traffic. Thus, a network analysis device, according to some implementations described herein, may include less costly processing devices, and/or may process more traffic of interest than network analysis devices that receive additional traffic.

Figure 2:
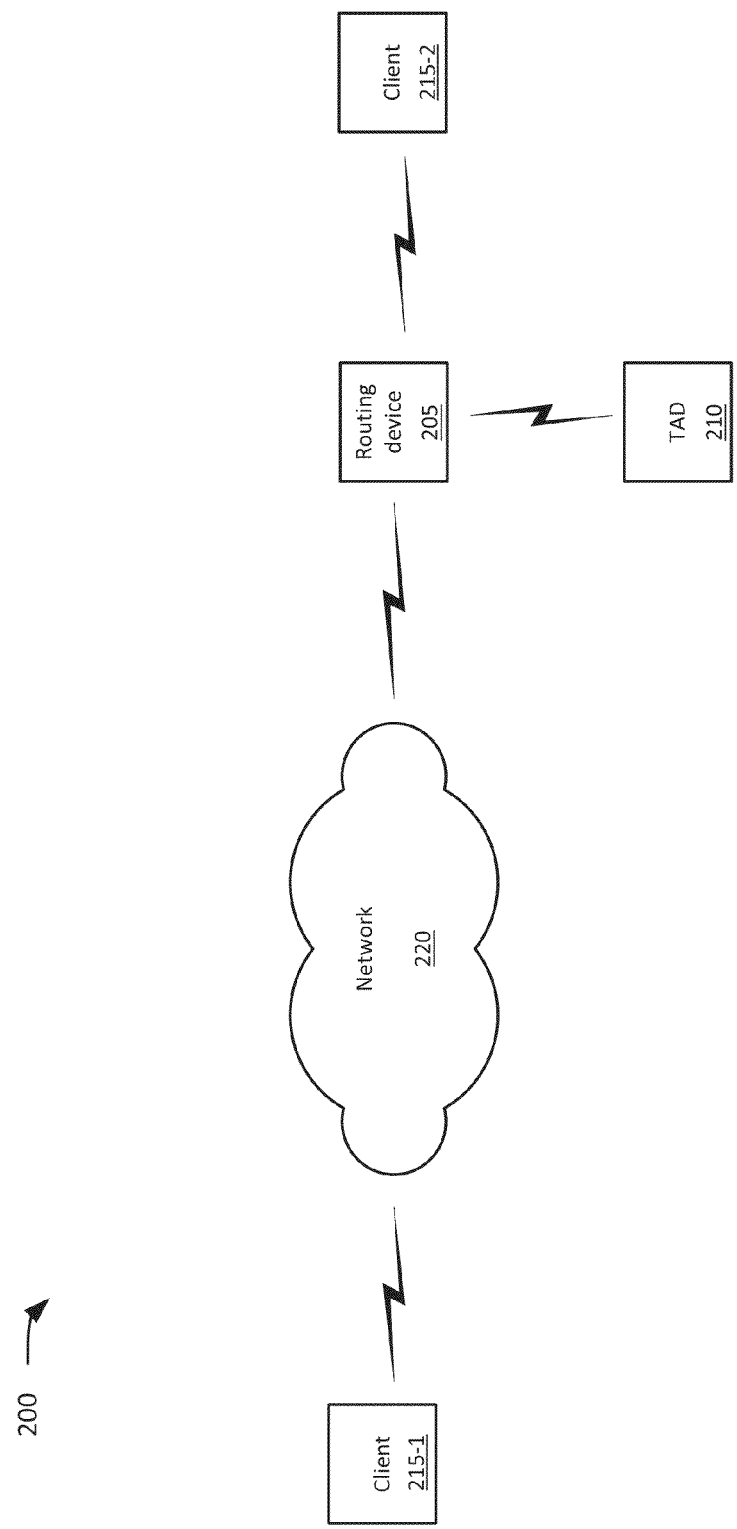
FIG. 2 illustrates an example environment in which systems and/or methods described herein may be implemented.

FIG. 2 illustrates an example environment 200 in which systems and/or methods described herein may be implemented. As shown, environment 200 includes routing device 205, traffic analysis device 210, clients 215-1 and 215-2 (which may be hereinafter referred to individually as "client 215," and collectively has "clients 215"), and network 220. One routing device 205, one traffic analysis device ("TAD") 210, two clients 215, and one network 220 are illustrated in FIG. 2 for simplicity. In practice, environment 200 may include additional routing devices, traffic analysis devices, clients, and/or networks.

Routing device 205 may include one or more devices that receive and/or output traffic, such as network traffic. Routing device 205 may include a router, a switch, a hub, or any other type of device that receives and forwards traffic. In some implementations, routing device 205 may include an edge router (e.g., may route data between multiple networks), a core router (e.g., a router that routes data between devices within a network), and/or any other type of routing device. Routing device 205 may perform one or more other functions, such as network address translation ("NAT"), firewall protection, access protection, Internet connection sharing ("ICS"), and/or any other function that is typically associated with routing devices.

Routing device 205 may include one or more interfaces, also referred to as ports. These ports may include physical ports (e.g., Ethernet ports) and/or logical ports. In some implementations, a particular port may, for example, be associated with one or more sources from which traffic is received, and/or one destinations to which traffic is forwarded.

As shown in FIG. 2, routing device 205 may be connected to client 215-2, traffic analysis device 210, and network 220. Routing device 205 may, for example, route traffic from client 215-1 (via network 220) to client 215-2, and/or from client 215-2 to client 215-1. For example, routing device 205 may receive traffic, analyze the traffic, identify (based on analyzing the traffic) that a destination of the traffic is client 215-2, and may forward some or all of the traffic to client 215-2. As further described below, according to some implementations described herein, routing device 205 may be configured to provide information based on portions of sent and/or received traffic (e.g., a copy of traffic of interest) to traffic analysis device 210.

Traffic analysis device 210 may include one or more devices that indicate traffic of interest to router 205, receive traffic of interest from router 205, and/or display information regarding traffic of interest. Traffic analysis device 210 may be connected to routing device 205 via a physical and/or a logical connection (e.g., a Generic Routing Encapsulation ("GRE") tunnel, an IP-to-IP tunnel, a Multiprotocol Label Switching ("MPLS") label-switched path ("LSP"), and/or any other type of stateless and/or dynamically signaled tunnel). Traffic analysis device and routing device 205 may signal each other using any protocol that is able to carry out the interactions described herein (e.g., port discovery, filter installation, traffic forwarding, etc.), such as, e.g., an Open-Flow protocol.

As described in further detail below, traffic analysis device 210 may receive filter information, e.g., from a user associated with traffic analysis device 210. The filter information may specify one or more ports associated with routing device 205, and/or one or more conditions that are based on attributes of traffic (e.g., destination address, source address, protocol, etc.). Traffic analysis device 210 may receive information based on traffic (e.g., a copy of the traffic) handled by routing device 205 that meets the one or more conditions specified by the filter information.

Clients 215 may include any type of device with communication capabilities. For example, client 215 may include a personal computer, a mobile telephone, a personal digital assistant ("PDA"), a tablet computer, a laptop, or any other type of device with communication capabilities.

Network 220 may include any type of network, such as a local area network ("LAN"), a wide area network ("WAN"), a telephone network—e.g., the Public Switched Telephone Network ("PSTN") or a cellular network—an intranet, the Internet, or a combination of networks. Routing device 205 and/or clients 215 may connect to network 220 via wired and/or wireless connections. In other words, routing device 205 and/or clients 215 may connect to network 220 via a wired connection, a wireless connection, or a combination of a wired connection and a wireless connection. Further, as mentioned above, environment 200 may include additional, fewer, and/or different networks than shown in FIG. 2. For example, in some implementations, environment 200 may include one or more networks between routing device 205 and traffic analysis device 210, may include one or more networks between routing device 205 and client 215-2, may include one or more additional networks between routing device 205 and client 215-1, etc.

Figure 3A:
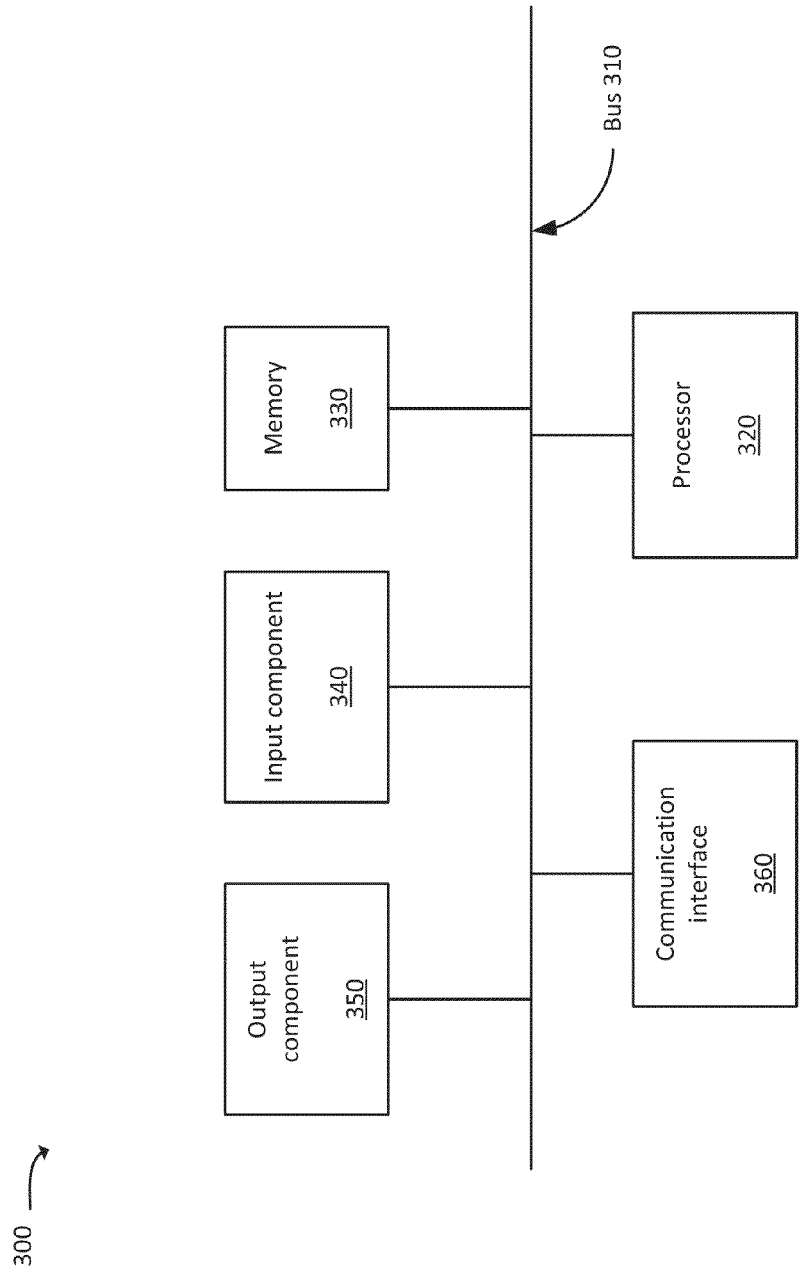
FIGS. 3A and 3B illustrate example components of one or more devices, according to one or more implementations described herein.

FIG. 3A illustrates example components of device 300. One or more of the devices discussed above, such as traffic analysis device 210 and/or clients 215 may include one or more devices 300. Device 300 may include bus 310, processor 320, memory 330, input component 340, output component 350, and communication interface 360. In another implementation, device 300 may include additional, fewer, different, or differently arranged components.

Bus 310 may include one or more communication paths that permit communication among the components of device 300. Processor 320 may include a processor, microprocessor, or processing logic that may interpret and execute instructions. Memory 330 may include any type of volatile storage device that may store information and instructions for execution by processor 320, and/or any type of non-volatile storage device that may store information for use by processor 320.

Input component 340 may include a mechanism that permits an operator to input information to device 300, such as a microphone, a keyboard, a keypad, a button, a switch, etc. Output component 350 may include a mechanism that outputs information to the operator, such as a display, a speaker, one or more light emitting diodes ("LEDs"), etc.

Communication interface 360 may include any mechanism that enables device 300 to communicate with other devices and/or systems. For example, communication interface 360 may include an Ethernet interface, an optical interface, a coaxial interface, or the like. Communication interface 360 may additionally, or alternatively, include a wireless communication device, such as an infrared ("IR") receiver, a Bluetooth radio, or the like. The wireless communication device may be coupled to an external device, such as a headset, a remote control, a wireless keyboard, etc.

Device 300 may perform operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 3B:
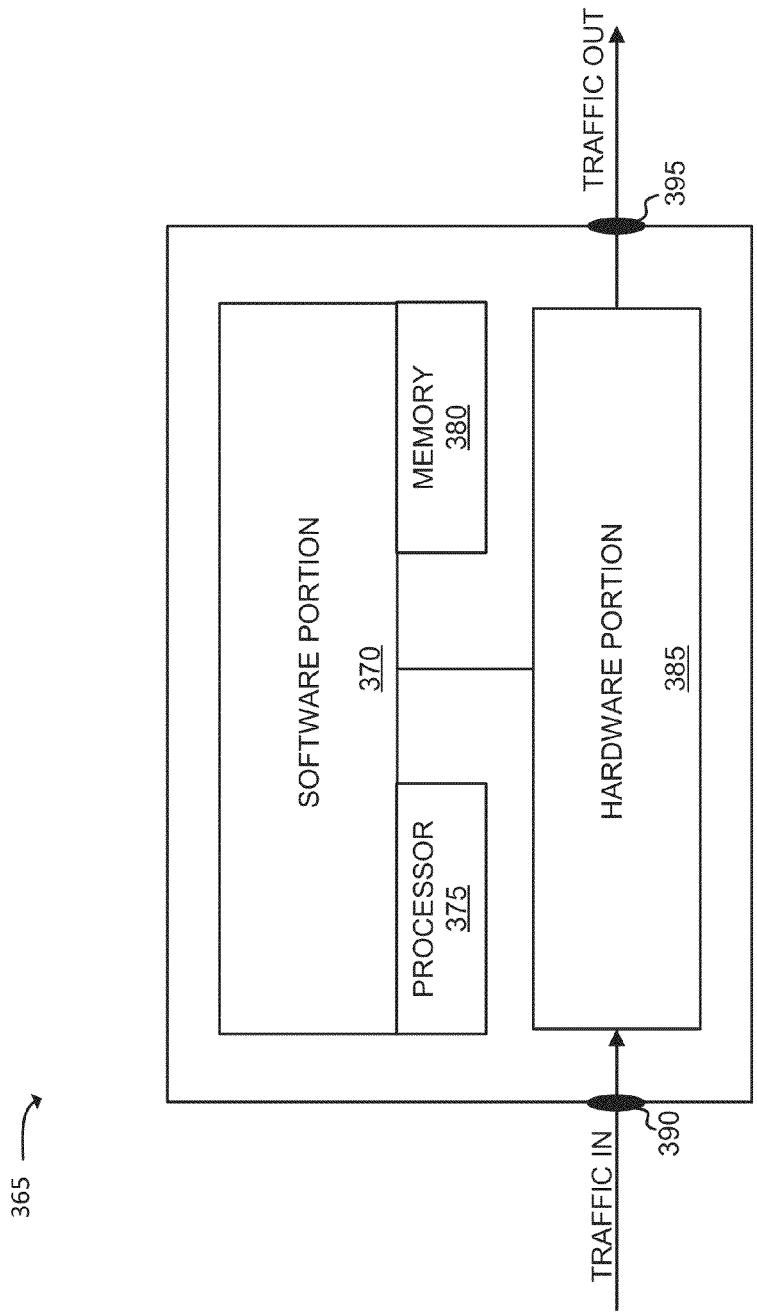

FIG. 3B is a diagram of an example implementation of routing device 365, which may correspond to, for example, routing device 205 of FIG. 2. In order to increase throughput, routing device 365 may use dedicated hardware to assist in processing network traffic. As shown in FIG. 3B, routing device 365 may generally include software portion 370 and hardware portion 385.

Software portion 370 may include software designed to control routing device 365. In general, software portion 370 may implement functions of routing device 365 that are not time critical. The functions described as being performed by software portion 370, may be implemented through, for example, one or more general purpose processors 375 and one or more memories 380. Processor 375 may include a processor, microprocessor, or processing logic that may interpret and execute instructions. Memory 380 may include any type of volatile storage device that may store information and instructions for execution by processor 375, and/or any type of non-volatile storage device that may store information for use by processor 375.

Hardware portion 385 may include circuitry for efficiently processing traffic received by routing device 365. Hardware portion 385 may include, for example, logic, such as an application specific integrated circuit ("ASIC"), a field programmable gate array ("FPGA"), and/or a content-addressable memory ("CAM"). Hardware portion 385 may receive incoming traffic (e.g., data packets associated with the incoming traffic) and may process the traffic based on, for example, information included in the traffic (e.g., header information associated with the data packets).

Routing device 365 may additionally include one or more input ports 390 for receiving incoming traffic and one or more output ports 395 for transmitting outgoing traffic. In some implementations, a port may act as both or one of an input port 390 or an output port 395. A port 390 or 395 may correspond to one or more links over which traffic may be transmitted and/or received. For example, a particular port may be an optical port into which an optical cable may be inserted. The optical cable may include a number of optical fibers, each of which may correspond to a link between routing device 365 and another network device.

Routing device 365 may perform operations in response to processor 375 executing software instructions stored in a computer-readable medium, such as memory 380. The software instructions may be read into memory 380 from another computer-readable medium or from another device. The software instructions stored in memory 380 may cause processor 375 to perform processes described herein. Alternatively, hardwired circuitry, such as hardware portion 385, may be used in place of or in combination with software instructions to implement processes described herein. Thus, implementations described herein are not limited to any specific combination of hardware circuitry and software.

Although routing device 365 is shown as including software portion 370 and hardware portion 385, routing device 365 may, in some implementations, be implemented entirely through hardware. Additionally, routing device 365 may include additional components, fewer components, different components, or differently arranged components than those illustrated in FIG. 3B.

Figure 4:
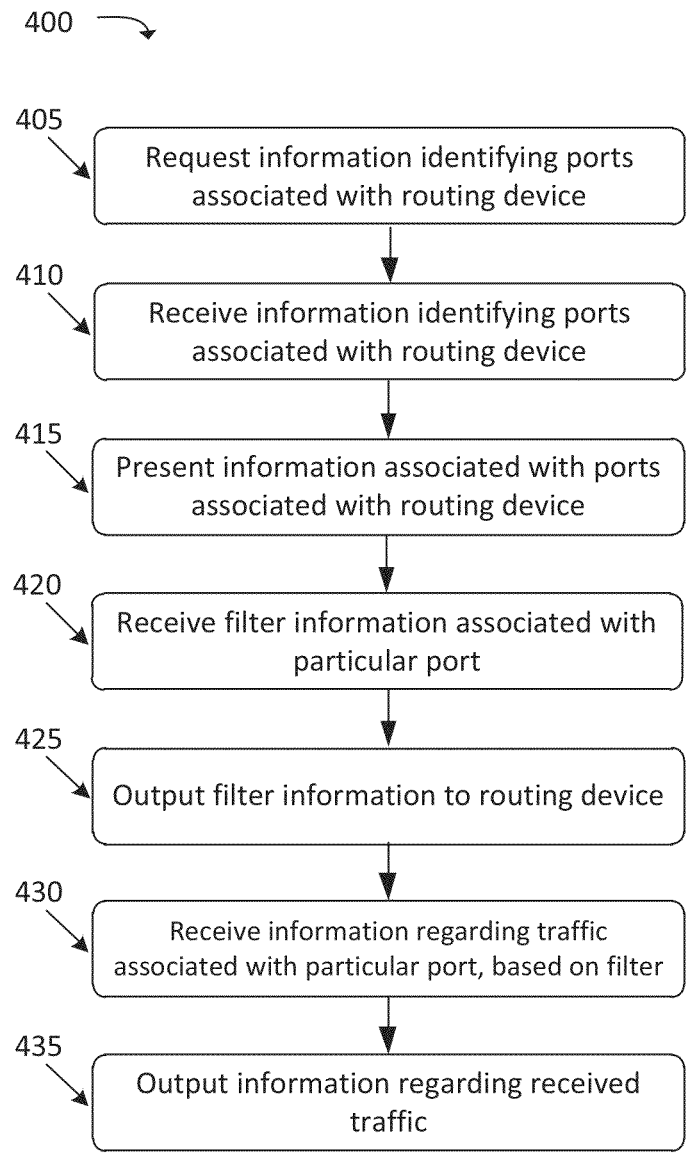
FIG. 4 illustrates a flowchart of an example process for providing filter information to a router and presenting information regarding filtered traffic, according to one or more implementations described herein.

FIG. 4 illustrates a flowchart of an example process 400 for providing filter information to a router and presenting information regarding filtered traffic. In some implementations, process 400 may be performed by traffic analysis device 210. In some implementations, process 400 may be performed by one or more other components instead of, or possibly in conjunction with, traffic analysis device 210.

Process 400 may include requesting information identifying ports associated with a routing device (block 405). For example, traffic analysis device 210 may request information identifying ports associated with routing device 205. In some implementations, the request may be initiated by, and/or received from, a network analysis software tool running on traffic analysis device 210. As mentioned above, the network analysis software tool may be a tool that is capable of analyzing ports that are local to a device on which the network analysis software tool (e.g., Wireshark, Tcpdump, Snort, and/or any other network analysis software tool). As also mentioned above, the network analysis software tool may, in some implementations, not be capable of analyzing ports that are not local to a device on which the network analysis software tool. The request for the information identifying ports may include a function call from the network analysis software tool. This function call may, in some examples, be a function call associated with discovering local ports (e.g., ports that are physically present on traffic analysis device 210).

As also mentioned above, traffic analysis device 210 may be associated with an implementation of one or more APIs (e.g., libpcap, BPF, etc.). Traffic analysis device 210 may request information identifying ports associated with routing device 205, based on the function call from the network analysis software tool, using, for example, the implementation of the API associated with traffic analysis device 210. For instance, assuming that traffic analysis device 210 is associated with libcap, the request may be made via an implementation of a function specified by the libpcap API for discovering ports that can be used to capture traffic, such as pcap_findalldevs(pcap_if_t **alldevsp, char *errbuf). As also mentioned above, this request may include a message according to one or more protocols, which may be used for discovering ports on routing device 205, such as OpenFlow, one or more proprietary protocols, and/or any other such protocol.

Process 400 may also include receiving information identifying ports associated with the routing device (block 410). For example, traffic analysis device 210 may receive information identifying ports associated with routing device 205. As further described below, this information may be identified and/or generated by routing device 205 in response to the request sent by traffic analysis device 210 at block 405. The information identifying ports associated with routing device 205 may, in some implementations, include information identifying all ports associated with routing device 205. In some implementations, the information identifying ports associated with routing device 205 may include information identifying fewer than all of the ports associated with routing device 205 (e.g., a set of ports that traffic analysis device 210 is authorized to access).

Process 400 may additionally include presenting information associated with the ports associated with the routing device (block 415). For example, traffic analysis device 210 may present, via a display device associated with traffic analysis device 210, information identifying the ports associated with routing device 205. Referring to the example shown in FIG. 1A, traffic analysis device 210 may present this information via a user interface, such as user interface 115. As discussed above, user interface 115 may be associated with a network analysis software tool that may be used to configure port filters, and/or monitor traffic associated with selected ports.

Process 400 may further include receiving filter information associated with a particular port (block 420). For example, traffic analysis device 210 may receive information specifying a filter associated with a particular port associated with routing device 205. In some implementations, traffic analysis device 210 may receive this information via the above-mentioned software analysis tool. For example, a user may specify filter information using user interface 115. As discussed above, the filter information may indicate conditions associated with traffic of interest. For instance, assume that a user is interested in traffic handled by a particular port of routing device 205, which is associated with a particular source address. In this situation, the user may provide filter information to traffic analysis device 210, specifying a condition based on the particular source address.

In some implementations, traffic analysis device 210 may generate a filter based on the filter information. For example, assuming that traffic analysis device 210 is associated with a libpcap API, traffic analysis device 210 may implement a function of the API that is associated with generating a filter (e.g., a BPF filter) based on the received filter information, such as pcap_compile(pcap_t *p, struct bpf_program *fp, char *str, int optimize, bpf_u_int32 netmask).

As another example, assume that a user is interested in traffic handled by a particular port of routing device 205, which is associated with a particular protocol. In this situation, the user may provide filter information to traffic analysis device 210, specifying a condition based on the particular protocol. As mentioned above, other example conditions may include, e.g., traffic associated with a particular source address, and/or traffic associated with a particular destination address. In some implementations, the filter information may include multiple conditions (e.g., traffic that is associated with a particular source address and a particular protocol, traffic that is associated with a particular source address and a particular destination address, traffic that is associated with a particular destination address and a particular protocol, traffic that is associated with a particular source address, a particular destination address, and a particular protocol, etc.).

Process 400 may also include outputting the filter information to the routing device (block 425). For example, traffic analysis device 210 may output the filter information (received at block 420) to routing device 205. For instance, in some implementations, traffic analysis device 210 may output information identifying the conditions associated with the filter information. In some implementations, traffic analysis device 210 may output a filter that was generated based on the filter information. The filter information outputted at block 425 may, in some implementations, be received from a network analysis software tool running on traffic analysis device 210.

As mentioned above, traffic analysis device 210 may be associated with an implementation of one or more APIs (e.g., libpcap, BPF, etc.). When outputting the filter information, traffic analysis device 210 may output the filter information according to one or more function calls of the API that is associated with traffic analysis device 210. For example, assuming that routing device 205 and traffic analysis device 210 are associated with a libpcap API, outputting the filter information may include performing a function that causes routing device 205 to provide information regarding traffic associated with a particular port, such as pcap_t *pcap_open_live(char *device, int snaplen, int promisc, int to_ms, char *ebuf). As also mentioned above, this filter information may be associated with a message according to one or more protocols, which may be used for providing filter information to routing device 205, such as OpenFlow, one or more proprietary protocols, and/or any other such protocol.

As also mentioned above, outputting the filter information may include outputting a generated filter to routing device 205. For instance, traffic analysis device 210 may output the filter mentioned above with respect to block 420. In some implementations, traffic analysis device 210 may implement a function associated with installing the filter to routing device 205. In other words, the function may cause routing device 205 to store information identifying conditions associated with traffic of interest. Assuming that traffic analysis device 210 implements a libpcap API, such a function may include, for example, pcap_setfilter(pcap_t *p, struct bpf_program *fp). In some implementations, outputting the filter information may include outputting an instruction to forward a copy of traffic of interest to traffic analysis device 210.

Process 400 may additionally include receiving information regarding traffic associated with the particular port, based on the filter (block 430). For example, traffic analysis device 210 may receive information regarding traffic of interest from routing device 205 (e.g., information regarding the traffic of interest, but not all of the traffic handled by the particular port of routing device 205). As further described below, routing device 205 may handle traffic via the particular port, of which a portion may be traffic of interest (i.e., match the condition(s) specified by the filter information outputted at block 425). Traffic analysis device 210 may receive information regarding this traffic of interest (e.g., information regarding this traffic of interest, but not other traffic handled by the particular port of routing device 205). For instance, traffic analysis device 210 may receive a copy of the traffic of interest from routing device 205.

Process 400 may further include outputting information regarding the received traffic (block 435). For example, traffic analysis device 210 may output, via a display device associated with traffic analysis device 210, information regarding the information received at block 430. Referring to the example shown in FIG. 1B, traffic analysis device 210 may output this information via a user interface, such as user interface 120. The information presented via user interface 120 may include any information regarding the traffic of interest, such as header information and/or any other information. For example, the information presented via user interface 120 may include a time that the traffic was received and/or sent by routing device 205, a source address associated with the traffic, a destination address associated with the traffic, a protocol associated with the traffic, information from a payload associated with the traffic, and/or any other information regarding the traffic. Additionally, or alternatively, traffic analysis device 210 may store information regarding the traffic of interest in, for example, a storage device.

Figure 5:
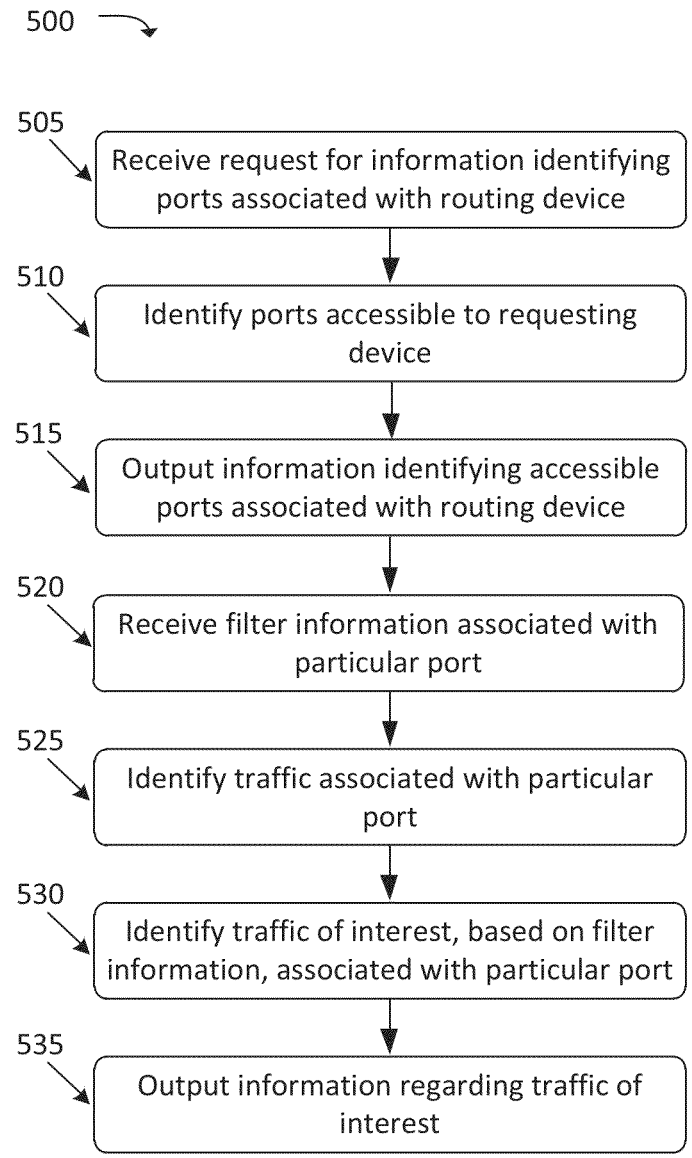
FIG. 5 illustrates a flowchart of an example process for outputting information regarding filtered traffic, according to one or more implementations described herein.

FIG. 5 illustrates a flowchart of an example process 500 for outputting information regarding filtered traffic, according to one or more implementations described herein. In some implementations, process 500 may be performed by routing device 205. In some implementations, process 500 may be performed by one or more other components instead of, or possibly in conjunction with, routing device 205.

Process 500 may include receiving a request for information identifying ports associated with a routing device (block 505). For example, routing device 205 may receive a request from traffic analysis device 210. As discussed above with respect to FIG. 4, this request may include a function call associated with an API implemented by traffic analysis device 210, such as libpcap.

Process 500 may also include identifying ports accessible to the requesting device (block 510). In some implementations, routing device 205 may use one or more authentication techniques to identifying ports accessible to the requesting device. For example, routing device 205 may identify ports, associated with routing device 205, that are accessible to traffic analysis device 210. In some implementations, routing device 205 may compare an identity of traffic analysis device 210 to a list that stores information associating ports of routing device 205 with devices, such as with traffic analysis device 210. In some implementations, traffic analysis device 210 may be associated with a particular routing instance, in which a particular set of ports of routing device 205 are accessible by traffic analysis device 210. In some implementations, routing device 205 may perform one or more other authentication techniques in order to identify ports of routing device 205 that are accessible to traffic analysis device 210.

Process 500 may also include outputting information identifying ports associated with the routing device (block 515). For example, routing device 205 may output information to traffic analysis device 210 regarding the ports identified at block 510.

Process 500 may further include receiving filter information associated with a particular port (block 520). For example, routing device 205 may receive filter information associated with a particular port from traffic analysis device 210. As discussed above with respect to FIG. 4, this filter information may include a generated filter. Additionally, or alternatively, routing device 205 may generate a filter based on the received filter information. Routing device 205 may install the filter (e.g., store information regarding conditions and the particular port associated with the filter). In some implementations, routing device 205 may install the filter in a kernel memory space of an operating system associated with routing device 205.

By installing the filter in the kernel memory space, routing device 205 may filter the traffic more efficiently (e.g., using less processing resources) than if the filter were installed in user memory space of the operating system. Furthermore, by installing the filter in kernel memory space of routing device 205 instead of in user memory space of an operating system associated with traffic analysis device 210, some implementations may avoid expending resources (e.g., processing resources and/or memory resources) of traffic analysis device 210.

Process 500 may also include identifying traffic associated with the particular port (block 525). For example, routing device 205 may handle (e.g., send and/or receive) traffic via the particular port. Process 500 may additionally include identifying traffic of interest, based on the filter information, associated with the particular port (block 530). For example, some or all of the traffic handled at block 525 may be traffic of interest (e.g., traffic that meets one or more conditions associated with the filter). As mentioned above, the traffic of interest may be only a relatively small portion of the traffic handled by routing device 205 via the particular port (e.g., 50%, 10%, 1%, 0.1%, less than 0.1%, etc.).

Process 500 may further include outputting information regarding the traffic of interest (block 535). For example, routing device 205 may generate a copy of the traffic of interest identified at block 530, and may forward the copy of the traffic to traffic analysis device 210. When outputting information regarding the traffic of interest, routing device 205 may forgo forwarding other traffic handled by routing device 205 (e.g., other traffic associated with the particular port, which is not traffic of interest) to traffic analysis device 210. In this sense, in some implementations, when outputting information regarding the traffic of interest, routing device 205 may forward only traffic of interest to traffic analysis device 210, without forwarding other traffic, that is not traffic of interest, to traffic analysis device 210. Routing device 205 may further forward the traffic as normal—that is, forwarding the copy of the traffic of interest may otherwise have no impact on the functionality of routing device 205.

In some implementations, when outputting information regarding the traffic of interest (at block 535), routing device 205 may additionally, or alternatively, output metadata regarding the traffic of interest (e.g., information regarding the traffic of interest, which is not itself extracted from the traffic of interest). Such metadata may include, for example, an original port on routing device 205 at which the traffic was received, a routing instance in which the traffic was received, a high precision time stamp as recorded by routing device 205, and/or any other information, such as other contextual information associated with the traffic of interest.

In some implementations, when outputting the metadata regarding the traffic of interest, routing device 205 may add additional header information, based on the metadata, when forwarding the traffic of interest to traffic analysis device 210. For instance, as shown in the example illustrated in FIG. 6, assume that routing device 205 and traffic analysis device 210 communicate through a tunnel, such as tunnel 610. In this example, routing device 205 may forward the information regarding the traffic of interest via tunnel 610. The forwarded information may be sent as several tunnel packets, such as tunnel packets 615-1, 615-2, 615-3 (referred to herein individually as "tunnel packet 615," and collectively as "tunnel packets 615"), and/or any quantity of tunnel packets (e.g., one tunnel packet 615, 100 tunnel packets 615, 100,000 tunnel packets 615, greater than 100,000 tunnel packets 615, etc.). Each tunnel packet 615 may include a portion of the forwarded information regarding the traffic of interest.

Figure 6:
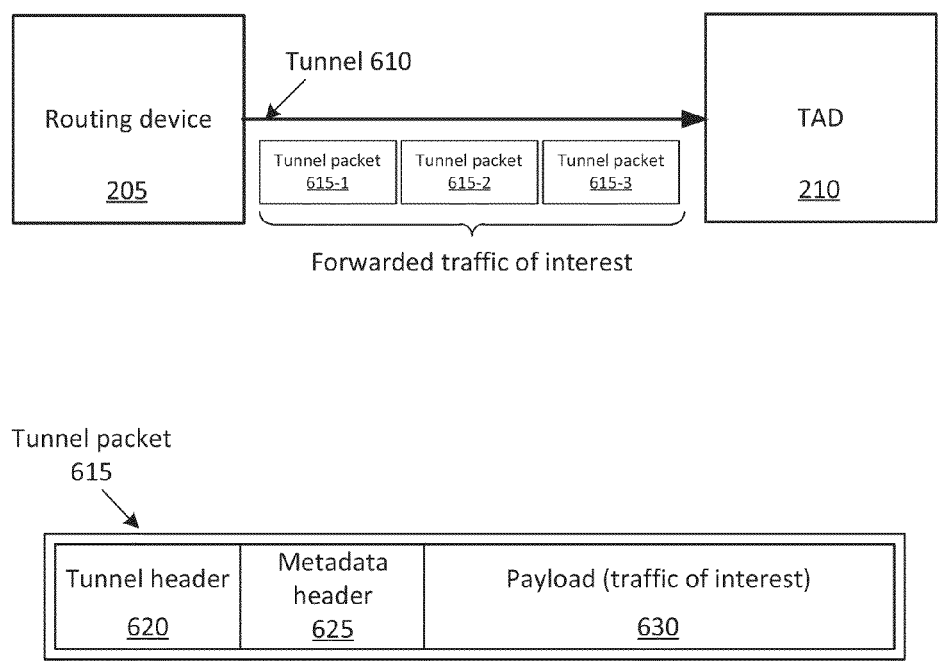
FIG. 6 illustrates an example of packets, which may correspond to a tunnel between a routing device and a traffic analysis device, according to one or more implementations described herein.

As shown in FIG. 6, an example tunnel packet 615 may include, for instance, tunnel header 620, metadata header 625, and payload 630. Tunnel header 620 may include, for instance, information that facilitates the communication between routing device 205 and traffic analysis device 210. Metadata header 625 may include, in some implementations, metadata regarding traffic of interest (e.g., metadata regarding the traffic of interest forwarded as payload 630). Payload 630 may include, for instance, some or all of the traffic of interest forwarded from routing device 205 to traffic analysis device 210. In some implementations, tunnel header 620 may include metadata in lieu of, or in addition to, metadata header 625 including metadata.

A system, and/or method, described herein, may allow a traffic analysis device to analyze portions of traffic (e.g., traffic of interest) handled by a routing device on a network. According to some implementations herein, the traffic analysis device may analyze portions of the traffic handled by the routing device without necessitating the routing device to send additional traffic to the traffic analysis device (e.g., traffic handled by the routing device that is not traffic of interest). That is, instead of providing a copy of extraneous traffic that is not traffic of interest (e.g., all traffic handled by the routing device, all traffic received/and or transmitted at a particular interface of the routing device, etc.), the routing device may provide a copy of only the traffic of interest to the traffic analysis device. As further described above, such techniques may be applied, in some implementations, using network analysis software tools that are designed to analyze local network traffic.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 4 and 5, the order of the blocks may be modified in other implementations. Further, non-dependent blocks may be performed in parallel. Furthermore, in some implementations, the processes described in these figures may include fewer, additional, or different blocks.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and is used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
   generating, by one or more processors of a traffic analysis device, a request for information regarding a port associated with a network device,
   the request being generated using a network analysis software tool, running on the traffic analysis device, capable of analyzing traffic at only ports included in the traffic analysis device;

transmitting, by the one or more processors, the request for information regarding the port to the network device;
receiving, by the one or more processors of the traffic analysis device, information regarding the port associated with the network device based on the request generated using the network analysis software tool;
providing, by the one or more processors, filter information to the network device,
the filter information including information associated with the port, and
the filter information specifying one or more conditions associated with traffic of interest;
receiving, by the one or more processors, from the network device, and based on the filter information, information regarding traffic received or sent by the network device via the port,
the traffic satisfying the one or more conditions associated with the traffic of interest; and
storing or outputting, by the one or more processors, a representation of at least a portion of the received information regarding the traffic.

2. The method of claim 1, where transmitting the request comprises transmitting, to the network device, the request for information identifying ports associated with the network device,
where receiving the information identifying the port comprises receiving, from the network device, information identifying the ports associated with the network device, the ports associated with the network device including the port; and
the method further comprising:
providing the information identifying the ports associated with the network device.

3. The method of claim 2, further comprising:
receiving, based on providing the information identifying the ports associated with the network device, the filter information.

4. The method of claim 1, where, when storing or outputting the representation of the at least the portion of the received information regarding the traffic, the method includes:
outputting the representation of the at least the portion of the received information regarding the traffic,
the representation including at least one of:
header information associated with the received information, time information associated with the received information,
source address information associated with the received information, destination address information associated with the received information, protocol information associated with the received information, or
payload information associated with the received information.

5. The method of claim 1, further comprising:
generating, based on receiving the information regarding the port, a filter, where the filter information includes the generated filter.

6. The method of claim 5, where, when generating the filter, the method includes:
implementing a function, based on receiving the filter information, to generate the filter.

7. The method of claim 1, where the filter information includes a plurality of user-specified conditions.

8. The method of claim 1, where generating the request comprises:
translating a command generated by the network analysis software tool, based on information regarding commands associated with the network device, to generate the request.

9. A device comprising:
a memory to store instructions; and
a processor connected to the memory to execute the instructions to:
generate a request for information regarding a port associated with a network device,
the request being generated using a network analysis software tool, running on the device, capable of analyzing traffic at only ports included in the device;
transmit the request for information regarding the port to the network device;
receive information regarding the port associated with the network device based on the request generated using the network analysis software tool;
provide filter information to the network device,
the filter information including information associated with the port, and
the filter information specifying one or more conditions associated with traffic of interest;
receive, from the network device and based on the filter information, information regarding traffic received or sent by the network device via the port,
the traffic satisfying the one or more conditions associated with the traffic of interest; and
provide a representation of at least a portion of the received information regarding the traffic.

10. The device of claim 9, where the processor, when receiving the information regarding the port, is to:
receive, from the network device, information identifying ports associated with the network device,
the ports associated with the network device including the port; and
where the processor is further to:
provide the information identifying the ports associated with the network device.

11. The device of claim 10, where the processor is further to:
receive, based on providing the information identifying the ports associated with the network device, the filter information.

12. The device of claim 9, where the representation includes at least one of:
header information associated with the received information,
time information associated with the received information,
source address information associated with the received information,
destination address information associated with the received information,
protocol information associated with the received information, or
payload information associated with the received information.

13. The device of claim 9, where the processor is further to:
generate, based on receiving the information regarding the port, a filter,
the filter information including the generated filter.

14. The device of claim 13, where the processor, when generating the filter, is to:
   implement a function, based on receiving the filter information, to generate the filter.

15. The device of claim 9, where the filter information includes a plurality of user-specified conditions.

16. A device comprising:
   a memory to store instructions; and
   a processor connected to the memory to execute the instructions to:
      receive, from another device, a request for information regarding ports included in the device,
         the request being generated using a tool, running on the other device, used to analyze traffic at only ports included in the other device;
      receive, from the other device, filter information,
         the filter information including information associated with a port of the ports, and
         the filter information specifying one or more conditions associated with traffic of interest;
      identify, based on receiving the filter information, information regarding traffic received or sent by the device via the port,
         the traffic satisfying the one or more conditions associated with the traffic of interest; and
      transmit, based on identifying the information regarding the traffic, the information regarding traffic to permit a representation of at least a portion of the transmitted information regarding the traffic to be provided for presentation.

17. The device of claim 16, where the processor is further to:
   identify, based on receiving the request for the information identifying the ports, ports accessible to the other device; and
   output information identifying the accessible ports,
      the accessible ports including the port.

18. The device of claim 17, where the processor, when identifying the ports accessible to the other device, is to:
   compare information associated with the other device to stored information associating ports of the device with information associated with a plurality of devices,
      the plurality of devices including the other device; and
   identify, based on comparing the information associated with the other device to the stored information associating ports of the device with information associated with a plurality of devices, the ports accessible to the other device.

19. The device of claim 17, where the processor, when identifying the ports accessible to the other device, is to:
   identify the ports accessible to the other device based on a particular routing instance associated with the other device.

20. The device of claim 16, where the processor is further to:
   generate a filter, and
   the processor, when identifying the information regarding the traffic, is to:
      identify, based on the generated filter, the information regarding the traffic.

* * * * *